United States Patent

Maruyama et al.

[11] Patent Number: 5,584,508
[45] Date of Patent: Dec. 17, 1996

[54] COMBINATION OF AN AIR BAG DEVICE AND A VEHICLE

[75] Inventors: Shigenori Maruyama; Tadayuki Atoh; Yoshihiko Minami; Ryoichi Yoshida; Noriyuki Kosugi, all of Shiga; Eiji Yanagi, Kanagawa; Yoshihiko Tanaka; Akira Kokeguchi, both of Shiga, all of Japan

[73] Assignee: Takata Corporation, Tokyo, Japan

[21] Appl. No.: 467,953

[22] Filed: Jun. 6, 1995

Related U.S. Application Data

[63] Continuation-in-part of Ser. No. 322,515, Oct. 14, 1994, abandoned.

[30] Foreign Application Priority Data

Nov. 5, 1993 [JP] Japan ..................................... 5-276811
Jun. 10, 1994 [JP] Japan ..................................... 6-128971

[51] Int. Cl.$^6$ .................................................. B60R 21/16
[52] U.S. Cl. ........................ 280/743.1; 280/732; 280/739
[58] Field of Search ........................ 280/743.1, 728.1, 280/730.1, 732, 739

[56] References Cited

U.S. PATENT DOCUMENTS

| | | | |
|---|---|---|---|
| 3,632,136 | 1/1972 | Foltz | 280/732 |
| 4,076,277 | 2/1978 | Kuwakado et al. | 280/743.1 |
| 4,169,613 | 10/1979 | Barnett | 280/739 |
| 4,186,941 | 2/1980 | Scholz et al. | 280/743.1 |
| 5,100,168 | 3/1992 | Horiuchi et al. | 280/728.1 |
| 5,306,043 | 4/1994 | Mihm et al. | 280/732 |

Primary Examiner—Eric D. Culbreth
Attorney, Agent, or Firm—Kanesaka & Takeuchi

[57] ABSTRACT

The invention is a combination of an air bag device and a vehicle. An air bag for the air bag device for a passenger seat or a rear seat is structured by superposing a lower panel and an upper panel and sewing up the peripheral portions of the panels. The lower panel is longer than the upper panel. Portions of the lower panel are superposed each other and extended out of the air bag so as to form elongated portions. A protrusion of the air bag is formed by sewing up side edges of the elongated portions with threads.

7 Claims, 13 Drawing Sheets

COMBINATION OF AN AIR BAG DEVICE AND A VEHICLE

CROSS REFERENCE TO RELATED APPLICATION

This is a continuation-in-part application of patent application Ser. No. 322,515 filed on Oct. 14, 1994, abandoned.

FIELD OF THE INVENTION AND RELATED ART STATEMENT

The present invention relates to an air bag of an air bag device for protecting an occupant in a passenger seat or a rear seat when a vehicle comes into collision.

Figure 18:
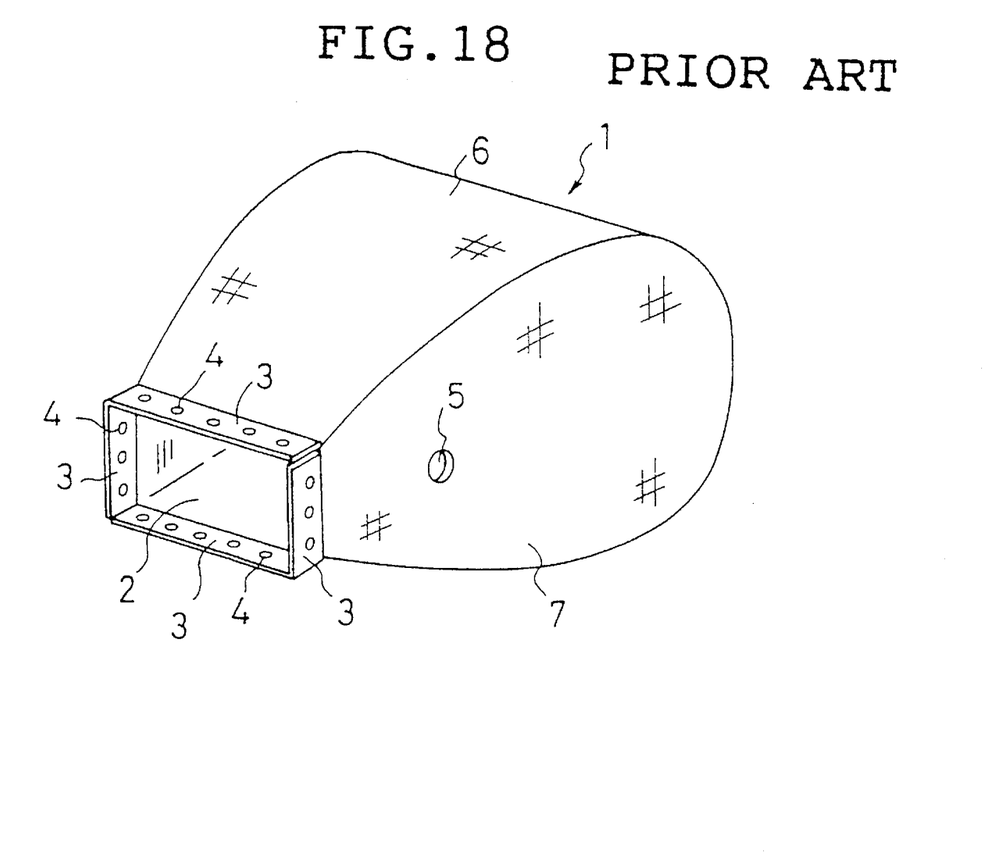
FIG. 18 is a perspective view of a conventional air bag for a passenger seat.

A conventional air bag for a passenger seat will be described with reference to FIG. 18.

The air bag 1 for a passenger seat has an opening 2 for introducing gas from an inflator (not shown) which is disposed at the rear portion of the air bag 1. The air bag 1 is made of cloth and provided with flaps 3 which are made by impregnating synthetic resin or piling up and sewing reinforcing cloths on the periphery of the opening 2. The flaps 3 are provided with a plurality of through holes for inserting bolts or rivets for connecting the air bag 1 to a container (not shown) of the air bag device.

Figure 19:
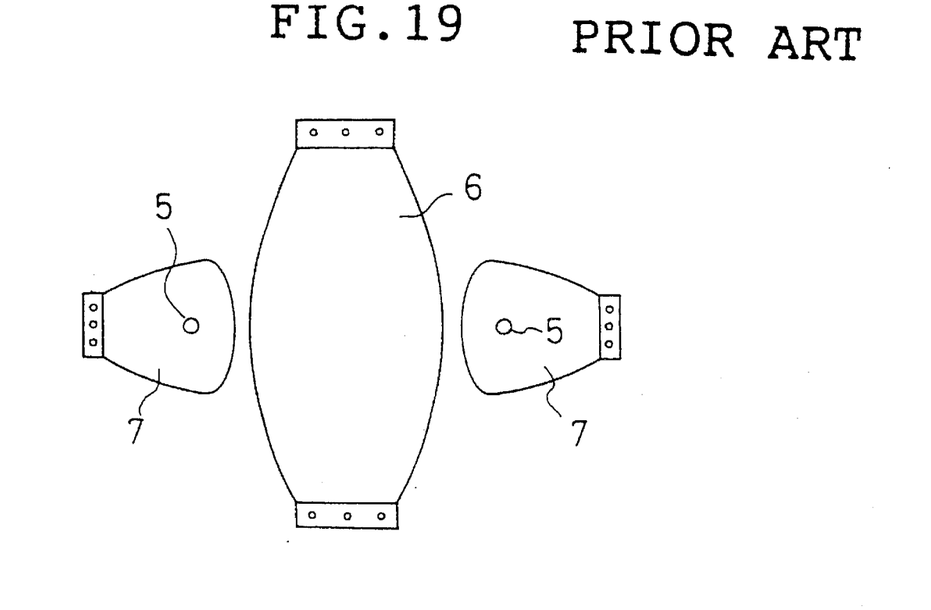
FIG. 19 is an exploded view showing the structure of the conventional air bag for a passenger seat.

The air bag 1 is made by sewing the peripheries of side panels 7 on the peripheries of a long center panel 6 as shown in FIG. 19.

Each of the side panels 7 is provided with a vent hole 5 previously. When the occupant plunges into the air bag 1, the vent holes 5 allow gas to flow out to absorb an impact applied to the occupant.

In the conventional air bag for a passenger seat as mentioned above, it takes a lot of time to sew the side panels 7 on the center panel 6 of a predetermined size because of a three-dimensional sewing.

That is, when each of the side panels 7 is sewed on the center panel 6, the peripheries of them are superposed on each other and sewed by a sewing machine. For superposing the peripheries, it is necessary to curve the center panel 6 along the periphery of the side panel 7. Therefore, it is difficult to superpose the edge portion of the center panel 6 on each of the peripheries of the side panels 7. Because the center panel 6 and the side panels 7 are sewed up with curving the center panel 6, it is difficult and takes a lot of time and labor to sew them up.

After one of side panels is sewed on the center panel another side panel is sewed on the center panel. Because the side panels are bulky, it is an obstacle to sew them up one by one.

OBJECT AND SUMMARY OF THE INVENTION

It is therefore an object of the present invention to provide an air bag which can be made easily. It is another object of the present invention to define a relative position between a vent hole and an opening for an inflator as desired in design.

An air bag according to the present invention relates to an air bag of an air bag device for a passenger seat or a rear seat. The air bag is made by superposing two panels and connecting the peripheral portions of the panels. In the air bag, one of the panels has a protrusion extending in front of knees of an occupant.

The air bag of the present invention protects knees and legs of an occupant because the protrusion extends in front of knees of the occupant. The protrusion thus deployed restricts the lower part of the body of the occupant from moving forward at a collision of a vehicle.

Since the air bag of the present invention is made by superposing panels such as two sheets of cloth and connecting the peripheries of them by sewing or the like, the air bag is produced easily.

Preferably, one of panels is longer than the other panel in the longitudinal direction of the vehicle, and a middle portion of the one of panels has elongated portions extending out of the air bag. Then, the elongated portions are superposed on and connected to each other at side edges thereof so as to form the protrusion.

The protrusion is formed easily because a middle portion of the one of panels is superposed and extended out of the air-bag to form elongated portions, and side edges of the elongated portions are connected to each other to form the protrusion.

Preferably, one of the panels has a vent hole and an opening for introducing gas from an inflator. The panels are preferably made of cloth and are connected by sewing.

As one of the panels is provided with an opening for an inflator and a vent hole, the relative portion between the opening and the vent hole can be kept constant.

DETAILED DESCRIPTION OF THE PREFERRED EMBODIMENT

Figure 10:
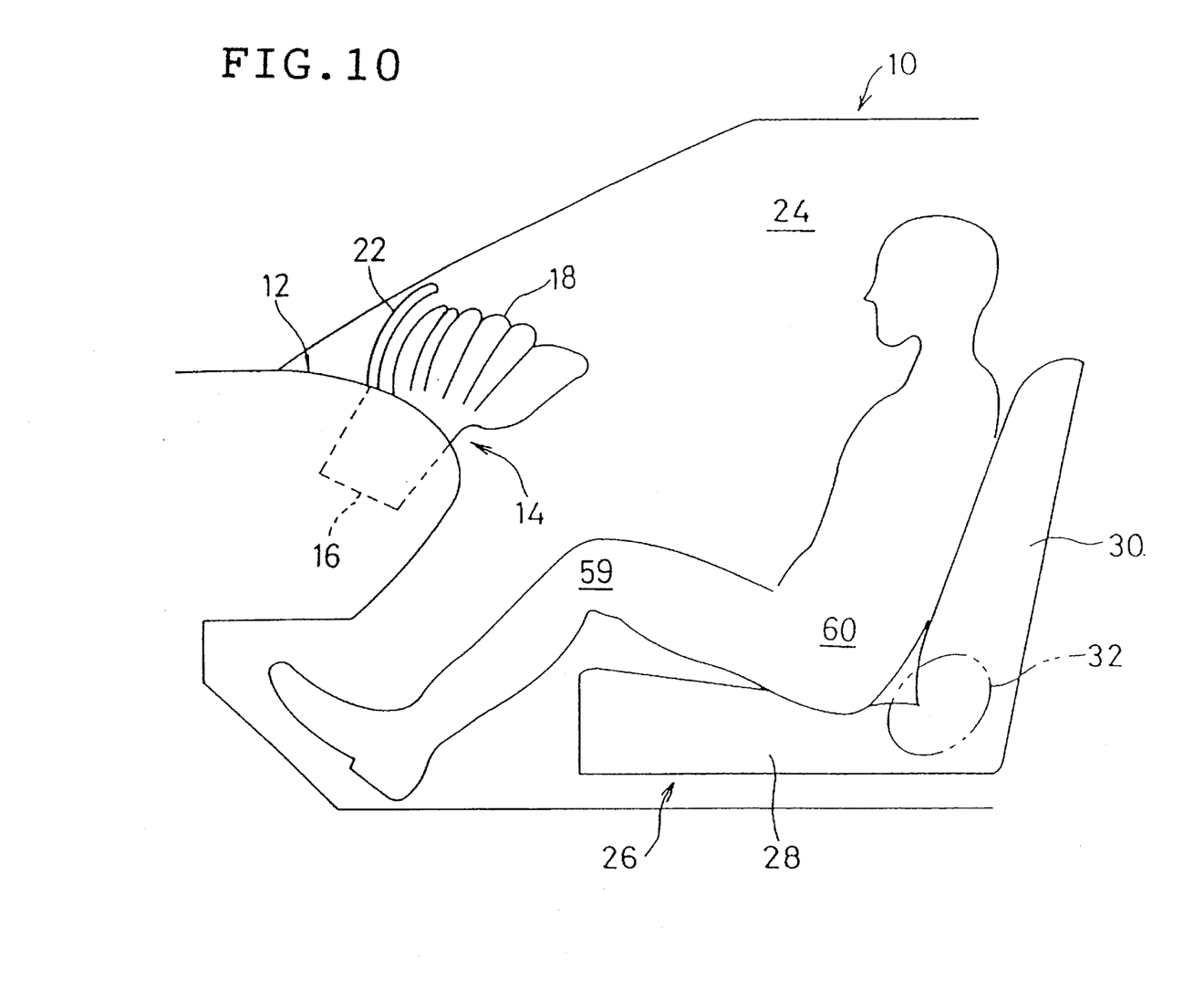
FIG. 10 is a side view of the inside of a vehicle mounted with an air bag device according to the embodiment.
Figure 11:
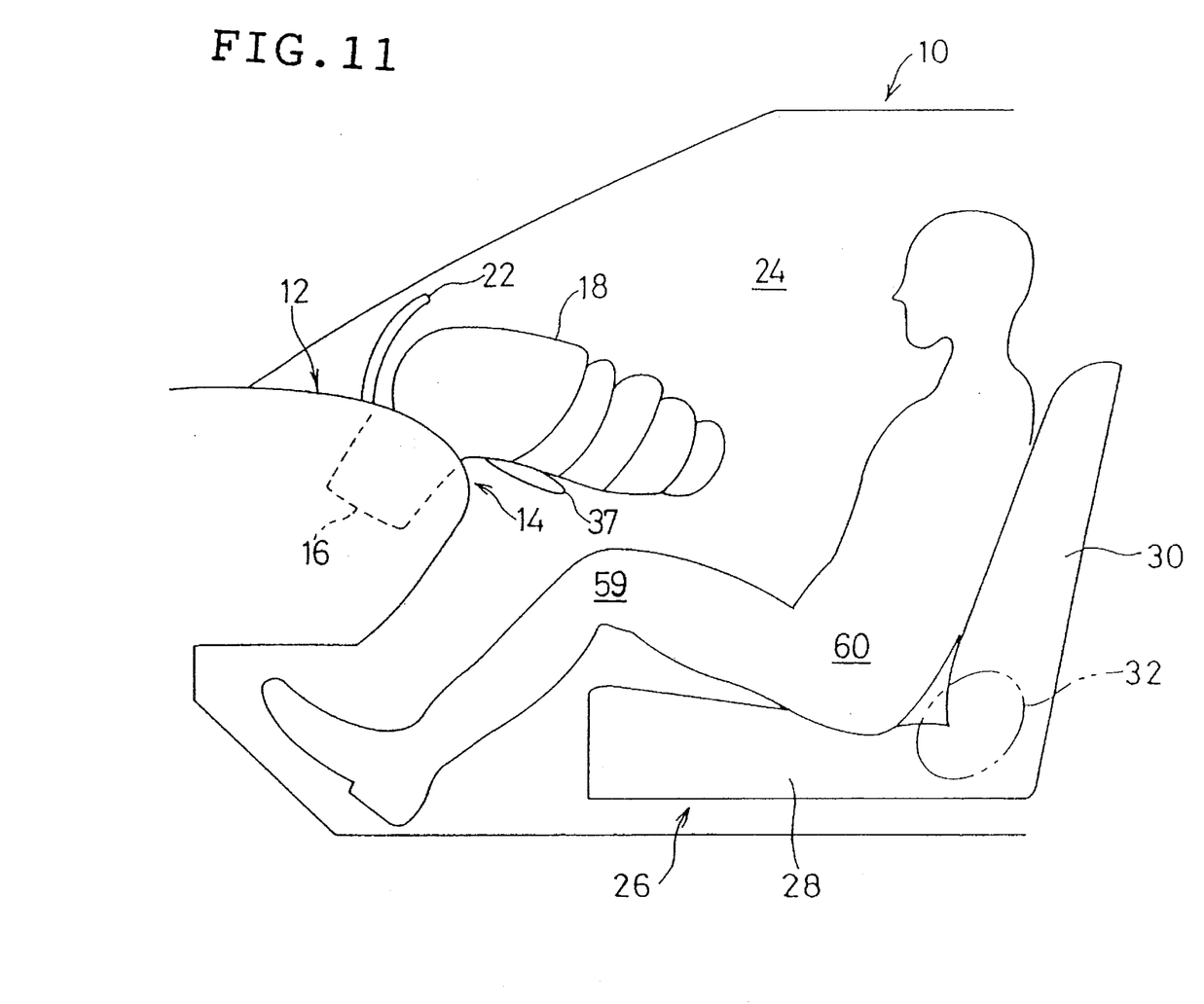
FIG. 11 is a side view of the inside of the vehicle mounted with the air bag device according to the embodiment.

Embodiments will now be described with reference to the attached drawings. FIGS. 1–9 are explanatory views of an air bag according to an embodiment of the present invention and FIGS. 10–12 are side views showing the inside of a vehicle mounted with an air bag device according to the embodiment.

Figure 12:
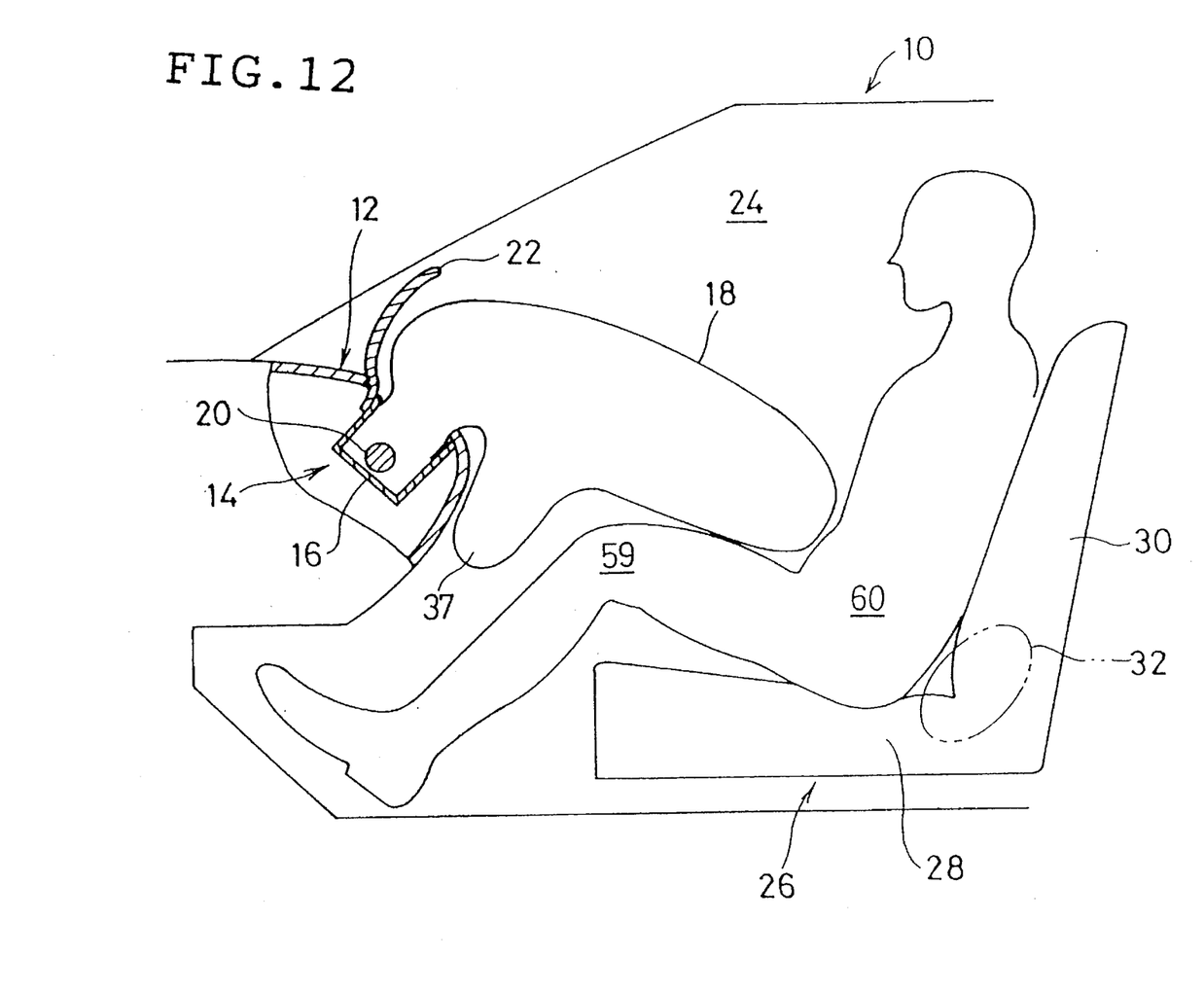
FIG. 12 is a side view of the inside of the vehicle mounted with the air bag device according to the embodiment.

As shown in FIG. 12, the air bag device 14 is mounted in an instrument panel 12 of the vehicle 10. The air bag device 14 has a casing 16, an air bag 18 folded and accommodated in the casing 16, an inflator 20 for generating gas for deploying the air bag 18, and a lid 22 covering the casing 16. The lid 22 has one side connected to the casing 16 to allow the lid to rotate toward the cabin 24 of the vehicle. The other side of the lid 22 opposite to the one side is connected to the casing 16 such that the other side of the lid can be separated from the casing 16 upon pushing force of the air bag 18 when the inflator 20 operates to deploy the air bag 18.

Figure 1:
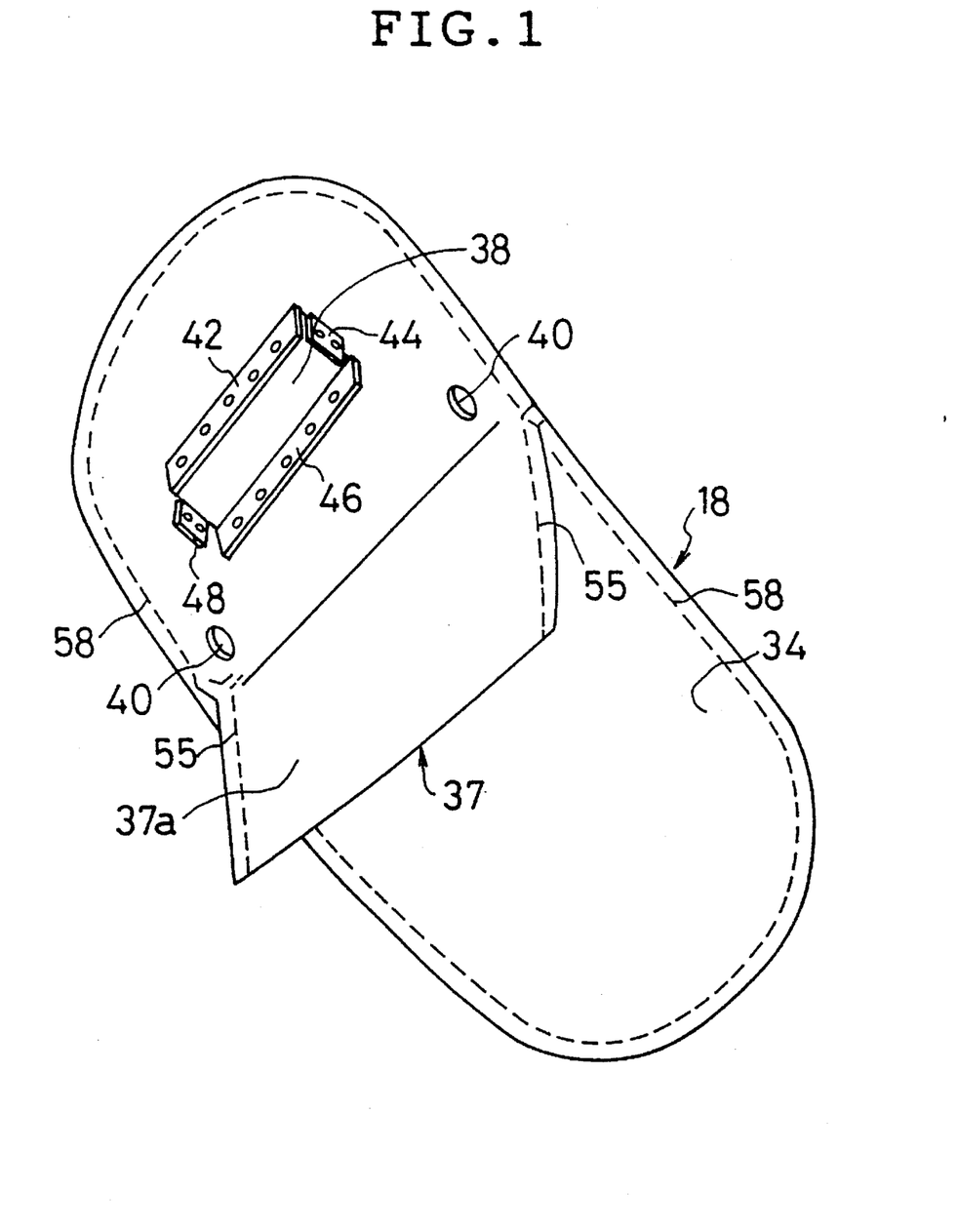
FIG. 1 is a perspective view of an air bag according to an embodiment of the present invention.
Figure 2:
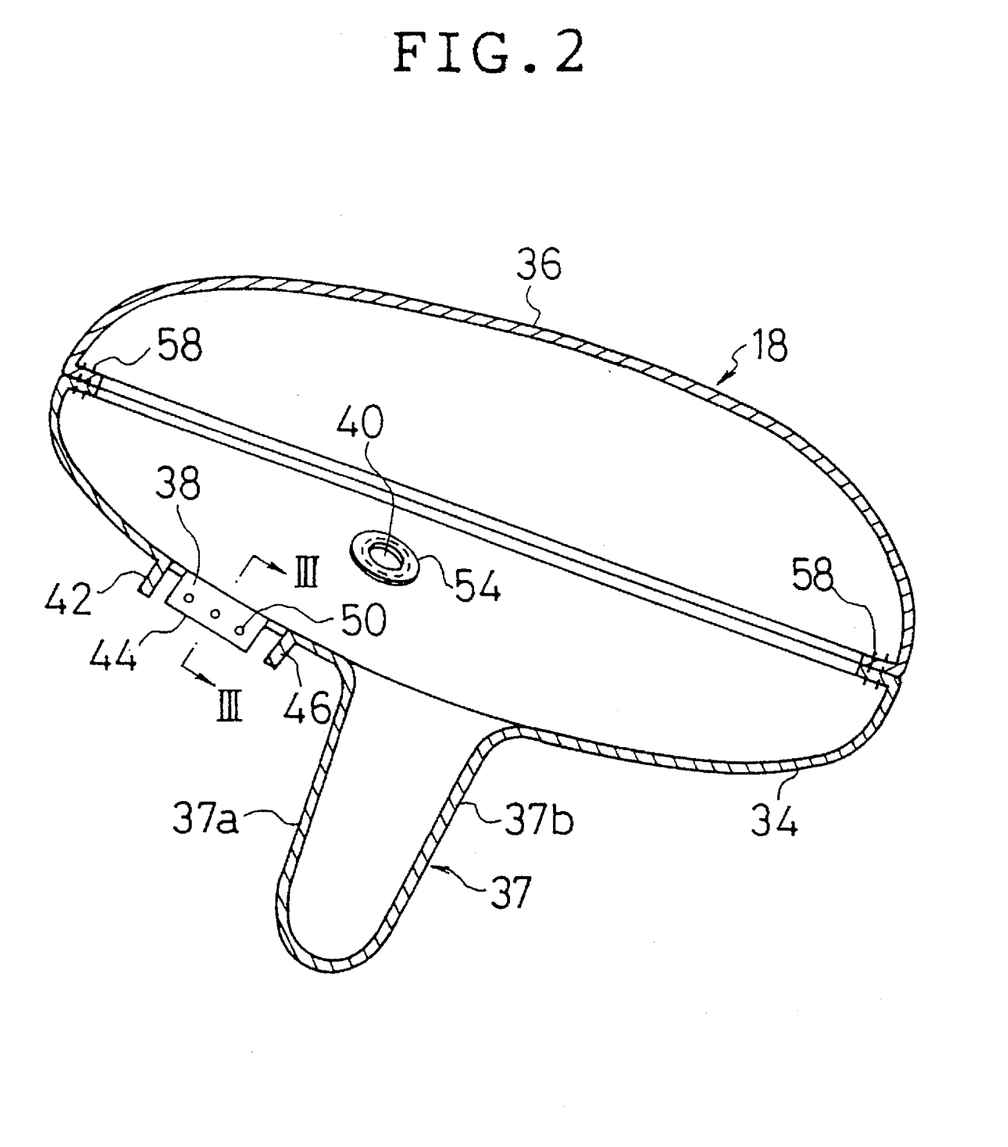
FIG. 2 is a section view of the air bag according to the embodiment.
Figure 3:
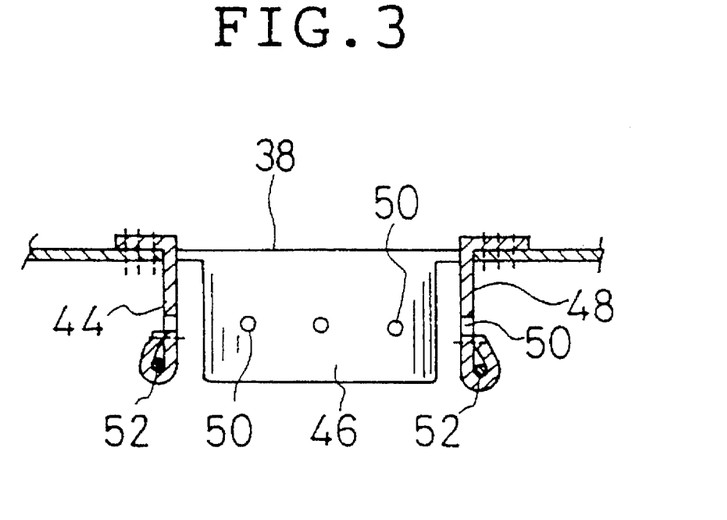
FIG. 3 is a section view taken along the line III—III in FIG. 2.

The air bag 18 is formed in an envelope shape by sewing up two sheets of cloth which are a lower panel 34 at the lower side thereof and an upper panel 36 at the upper side thereof, as shown in FIGS. 1,2. The air bag 18 has a protrusion 37 capable of deploying in front of knees of an occupant in a passenger seat. The air bag 18 is structured to extend toward the portion about the corner 32 where a seat cushion 28 and a seat back 30 of a seat 26 in the vehicle 10 meet each other as shown in FIGS. 10–12.

The lower panel 34 has an opening 38 for introducing gas from the inflator 20 and vent holes 40. Flaps 42, 44, 46, and 48 are disposed on the periphery of the opening 38 and are connected to the casing 16.

Figure 9:
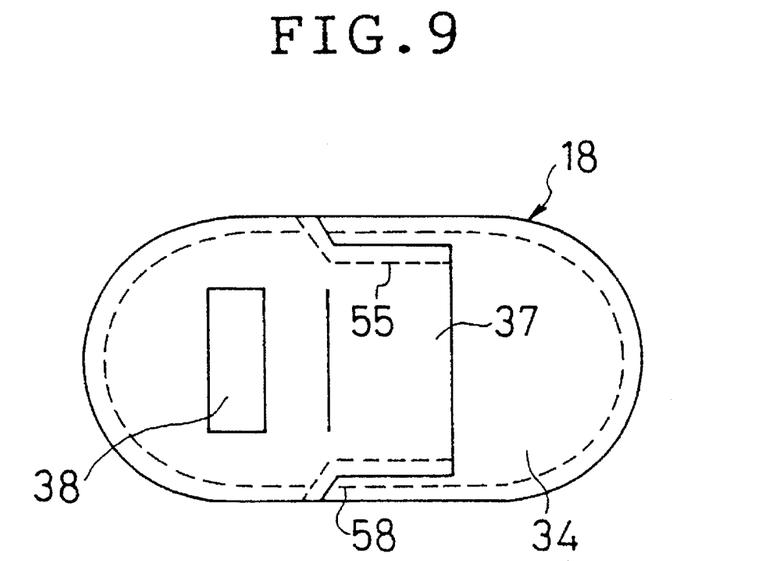
FIG. 9 is a bottom view of the air bag according to the embodiment.

As shown in FIG. 9, the panels 34 and 36 are formed in a shape extending longer in the longitudinal direction than the width direction of the vehicle 10. The opening 38 in the air bag 18 is positioned near the front of the vehicle.

The flaps 42 and 46 are integral with the lower panel 34. The flaps 44 and 48 are formed by sewing another cloths on the lower panel 34. However, all the flaps may be integral with the lower panel or may be provided by sewing another cloths on the lower panel.

The flaps 42,44,46,48 are provided with a plurality of through holes 50 (circular holes or slits may be employed) for inserting bolts or rivets. The tips of the flaps 42–48 are turned back to hold reinforcing rods 52 and are sewed on the flaps 42–48, respectively.

Figure 4:
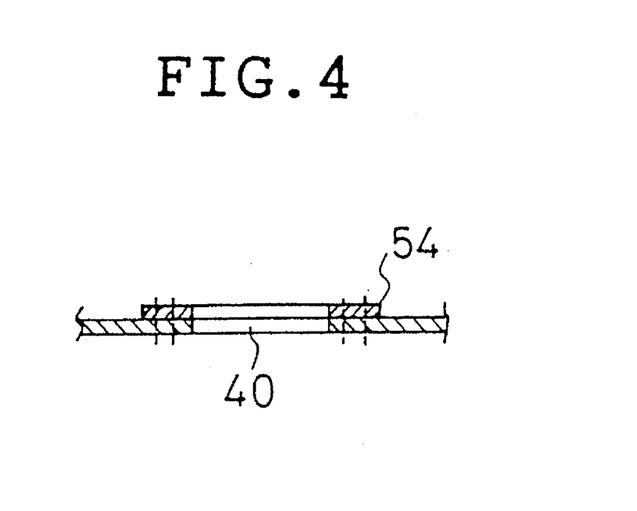
FIG. 4 is a section view of a vent hole of the air bag according to the embodiment.

Each vent hole 40 is provided with a ring-shaped patching cloth 54 sewed on the periphery thereof as shown in FIGS. 2, 4.

Figure 5:
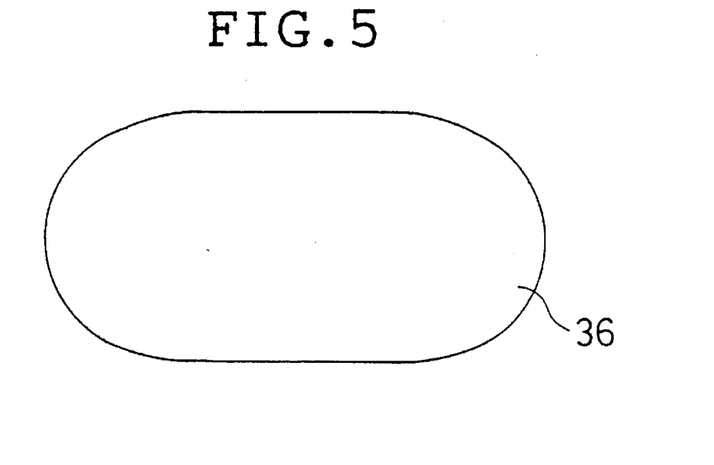
FIG. 5 is a plan view of an upper panel of the air bag according to the embodiment.
Figure 6:
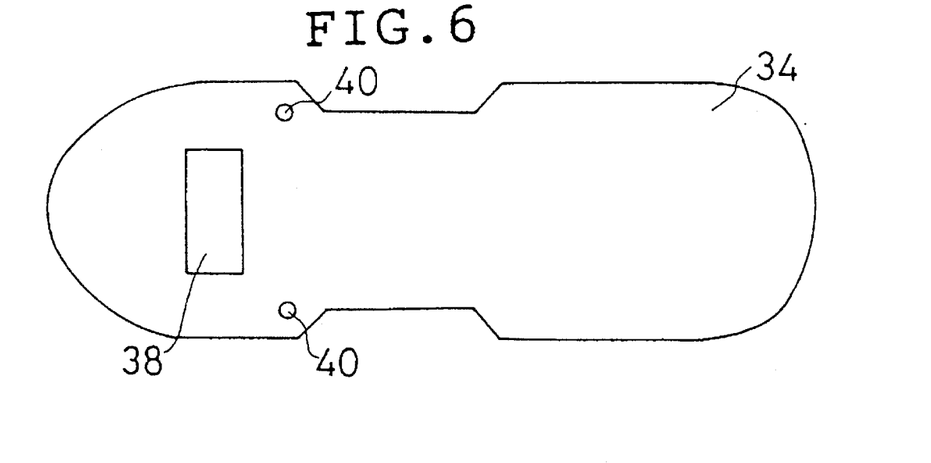
FIG. 6 is a plan view of a lower panel of the air bag according to the embodiment.
Figure 7:
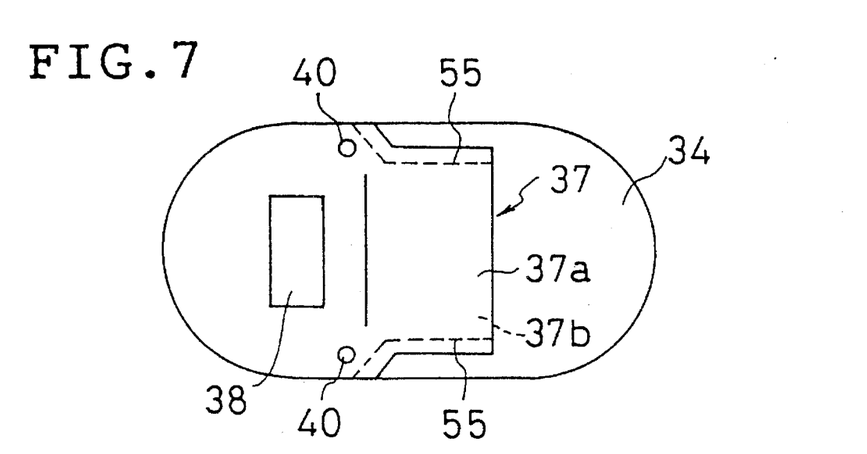
FIG. 7 is a plan view of the lower panel, in the process of sewing of the air bag according to the embodiment.

The lower panel 34 is longer than the upper panel 36 in the longitudinal direction of the vehicle as shown in FIGS. 5, 6. As shown in FIG. 7, a middle portion of the lower panel 34 in the longitudinal direction of the vehicle is folded and superposed so as to extend out of the air bag in order to form elongated portions 37a and 37b. The elongated portions 37a, 37b are sewed up with threads 55 at the side edges thereof to form the protrusion 37.

Figure 8:
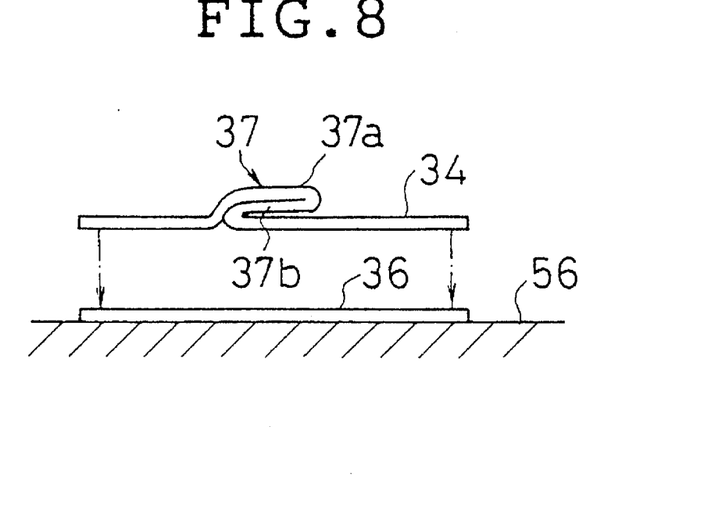
FIG. 8 is a side view showing a sewing method of the air bag according to the embodiment.

The panels 34 and 36 are, as shown in FIG. 8, superposed on each other on a work bench 56 of a sewing machine. The peripheral portions of the panels 34 and 36 are, as shown in FIG. 9, sewed up securely with a thread 58.

It is quite easy to sew them up because the two panels 34 and 36 are sewed in a state that the panels 34 and 36 are superposed on the flat work bench 56 as mentioned above.

It is preferable that the panel 36 is sewed to the panel 34 after the side edges of the elongated portions 37a, 37b are sewed with the threads 55. Although the panel 36 is placed on the work bench 56 in FIG. 8, the panel 34 is instead placed on the bench 56 to be superposed thereon with the panel 36.

The panels 34 and 36 are preferably structured so as to cross aslant textures of the panels with each other.

When the vehicle mounted with the air bag device 14 as structured above comes into collision, the inflator 20 spouts out gas to deploy the air bag 18. The lid 22 is pushed by the deploying air bag 18 and opens toward the cabin 24 of the vehicle. The air bag 18 then extends into the cabin 24 of the vehicle, as shown in FIG. 10. The air bag 18 extends toward the portion about the corner 32 where the seat cushion 28 and the seat back 30 meet each other, as shown in FIG. 11. The air bag 18 finally touches the waist 60 of the occupant to restrain the waist 60 of the occupant, and the protrusion 37 is deployed in front of knees 59 of the occupant as shown in FIG. 12.

The knees and legs of the occupant are protected by the protrusion 37. The protrusion 37 restricts the lower part of the body of the occupant from moving forward.

As a result of various kinds of experiments, it proven that the air bag 18 restraining the waist 60 can protect enough the occupant, similar to a conventional air bag deployed widely in front of the upper part of the occupant, such as a part from the chest to the head of the occupant.

The air bag 18 of the air bag device 14 has a small volume as compared with a conventional air bag which deploys widely in front of the upper part of the occupant. Therefore, the air bag 18 is completely deployed in a short time. Furthermore, it is possible to reduce the capacity of the inflator 20.

Figure 13:
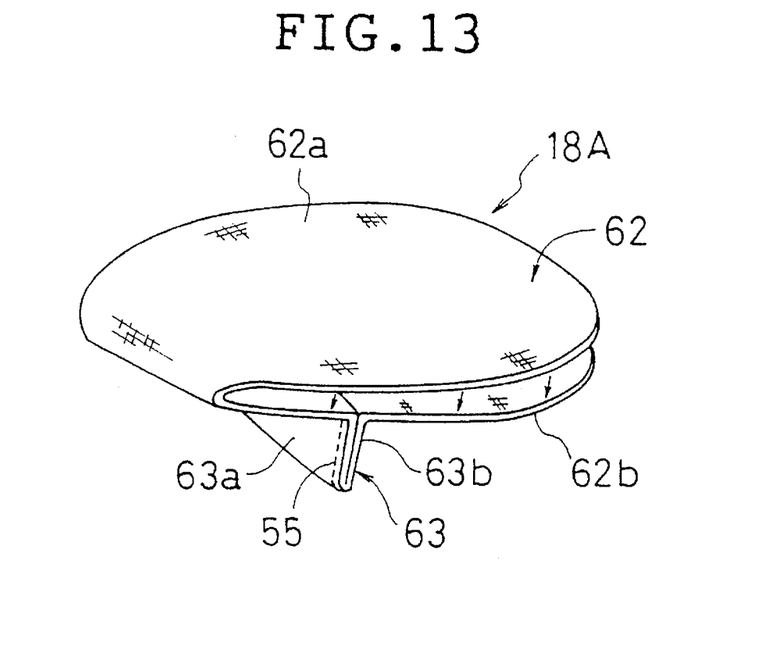
FIG. 13 is a perspective view showing a production method of an air bag according to another embodiment.

Though the air bag 18 made by sewing up two panels 34 and 36 is employed in the above embodiment, an air bag according to the present invention may be an air bag, such as an air bag 18A shown in FIG. 13, which is structured by folding one sheet of a panel 62 in two and sewing up the peripheral portions of an upper panel 62a and a lower panel 62b. Reference numeral 63 denotes a protrusion which is formed by sewing with threads 55 side edges of elongated portions 63a, 63b which are superposed and extended out of the air bag 18A.

Figure 14:
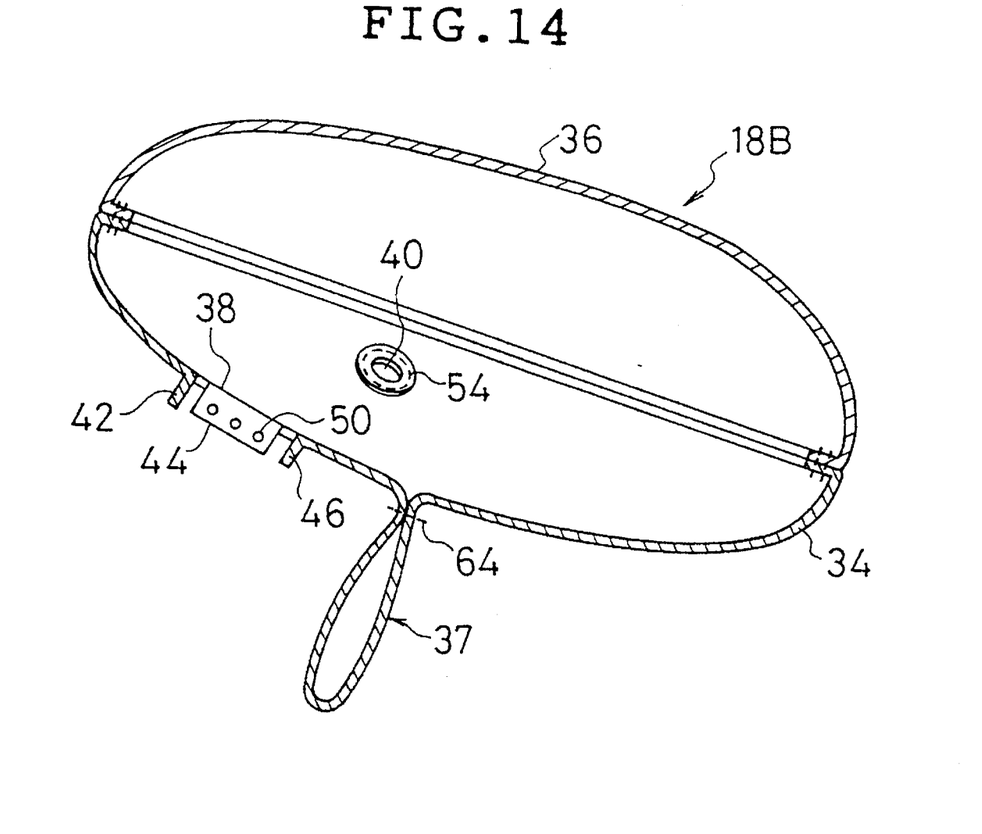
FIG. 14 is a section view of an air bag 18B according to further another embodiment.
Figure 15:
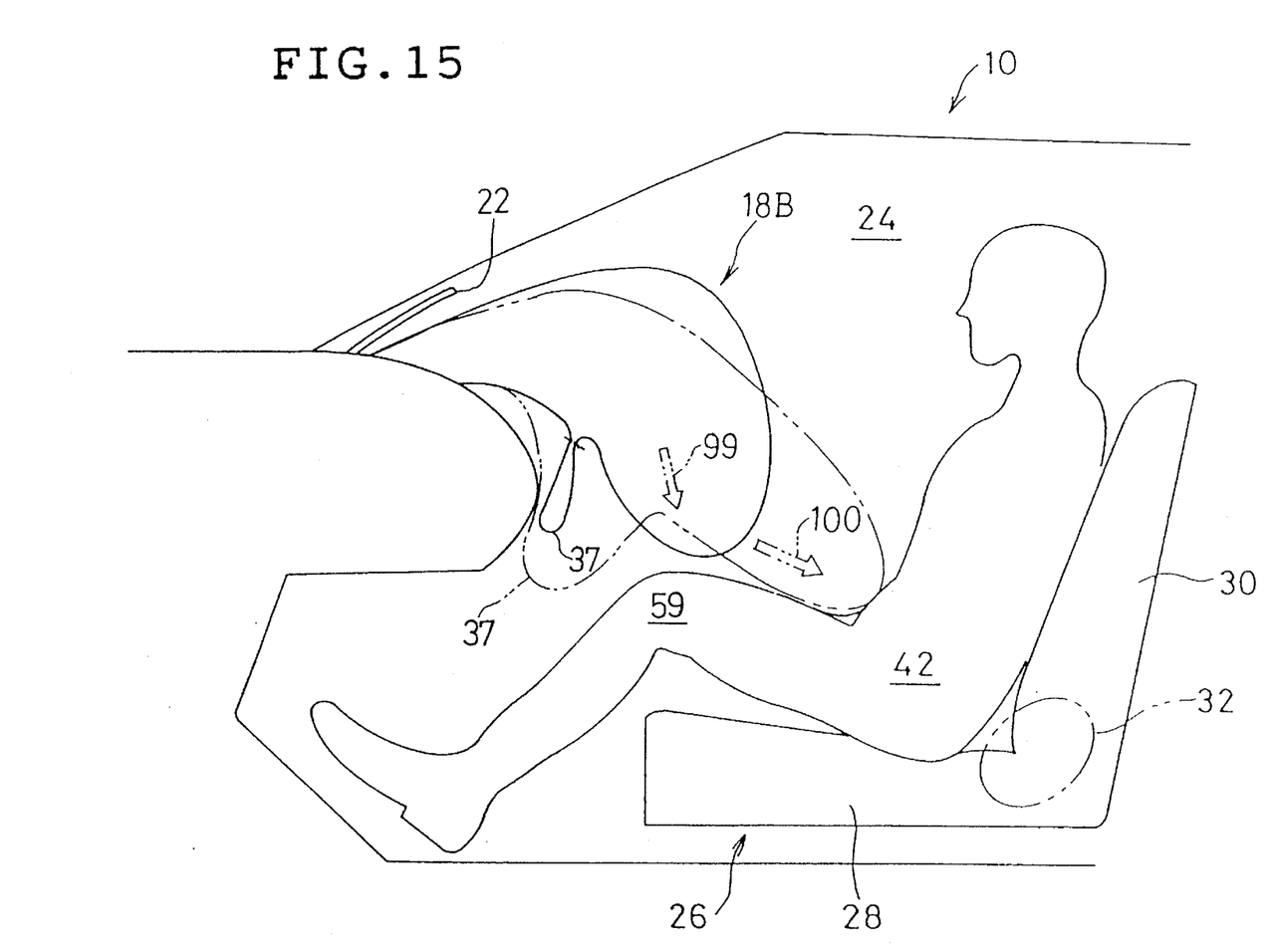
FIG. 15 is a side view of the inside of a vehicle mounted with the air bag 18B according to the embodiment.

FIG. 14 is a section view of an air bag 18B and FIG. 15 is a side view of the inside of a vehicle mounted with an air bag device according to another embodiment of the present invention.

In the air bag 18B used for this embodiment, an inlet of the protrusion 37 is sewed up with a thread 64. The thread 64 has a characteristic to snap when a tensile force applied to the thread 64 exceeds a predetermined value due to an inner pressure of the air bag 18B exceeding a predetermined value. The other structure is identical to the embodiment in FIGS. 1–12 and the same numerals denote same components.

In the air bag device as structured above, the air bag 18B is deployed by an operation of the inflator. The thread 64 does not snap until the air bag 18B becomes in an intermediate deploying state as shown by a solid line in FIG. 15.

After the intermediate deploying state, the inner pressure in the air bag 18B is increased so that the tensile force applied to the thread 64 exceeds the strength of the thread 64, to thereby snap the thread 64. Since the thread 64 snaps at the latter half of the deployment of the air bag, the tip portion of the air bag 18B extends toward the seat cushion 28 first as shown by the arrow 99 and, by a snap of the thread 64, the air bag then extends toward the portion about the corner 32 where the seat cushion 28 and the seat back 30 meet each other, as shown by the arrow 100. The protrusion 37 is deployed in front of knees 59 of the occupant by the snap of the thread 64.

Figure 16:
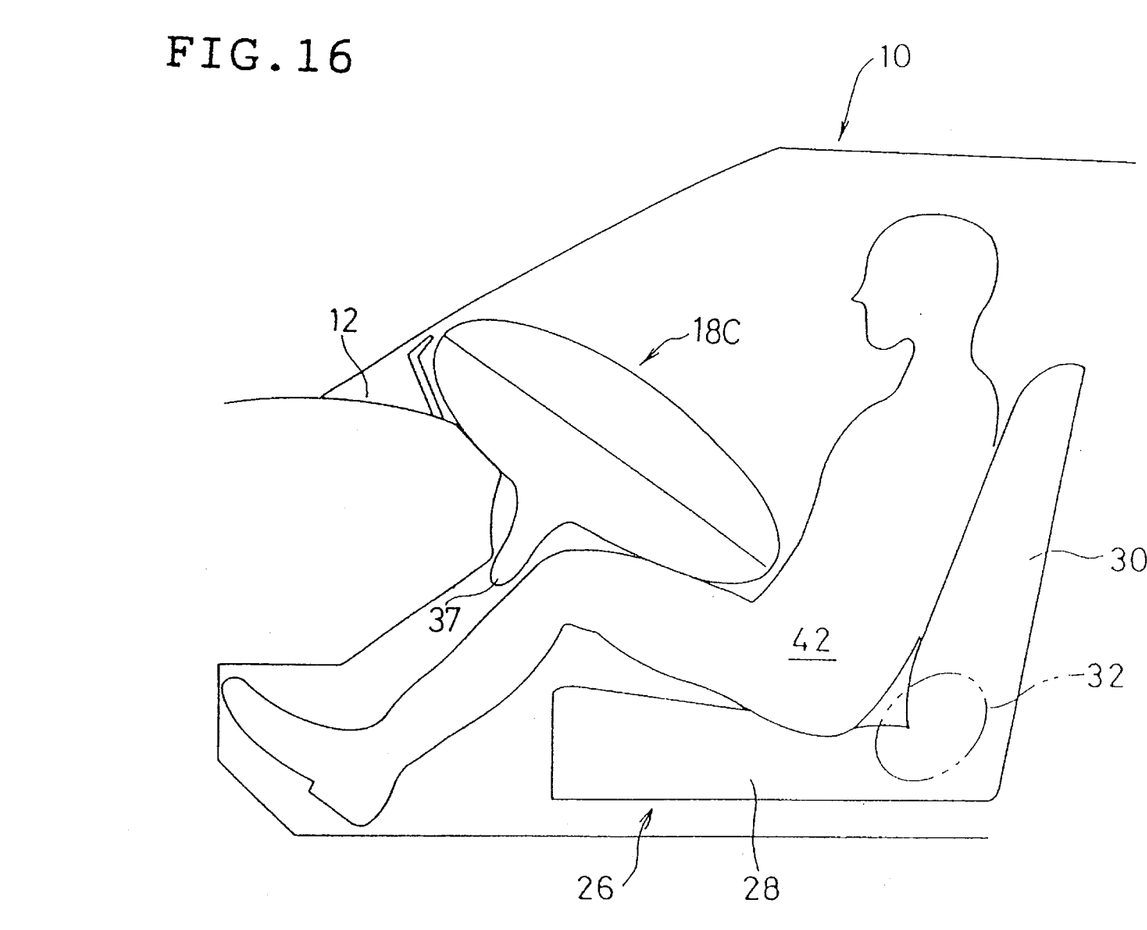
FIG. 16 is a side view of the inside of a vehicle mounted with an air bag 18C according to another embodiment.
Figure 17:
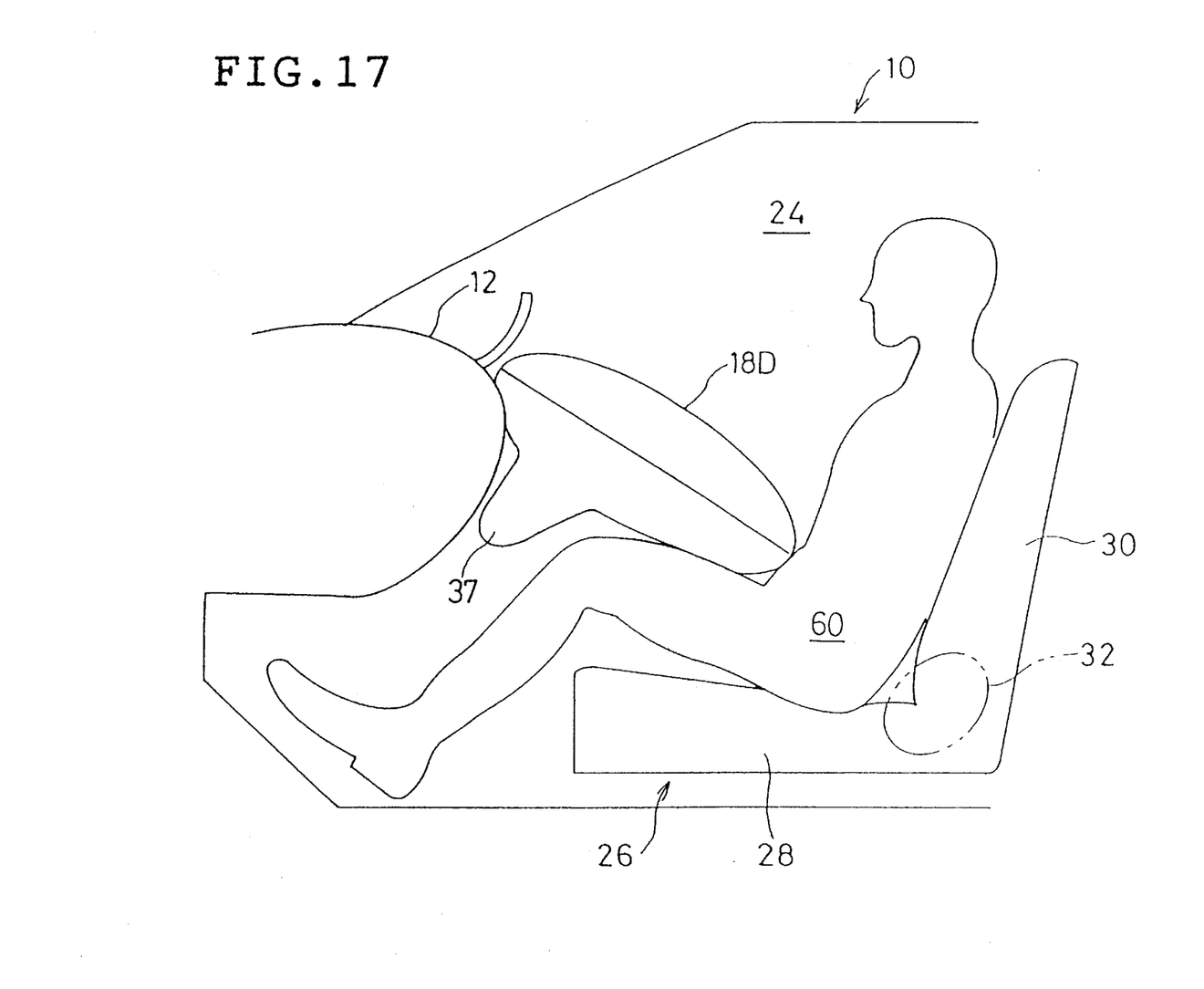
FIG. 17 is a side view of the inside of a vehicle mounted with an air bag 18D according to a different embodiment of the present invention.

The air bag according to the present invention can be used for a top-mount-type air bag device or a mid-mount-type air bag device by changing the position of the opening 38 for an inflator such as air bags 18C, 18D shown in FIGS. 16, 17.

The top-mount-type air bag device is mounted in the upper part of the instrument panel as shown in FIG. 16, and the mid-mount-type air bag device is mounted in the middle part in the vertical direction of the instrument panel 12 as shown in FIG. 17.

The air bag device is mounted on the instrument panel 12 in the above mentioned embodiments, but the air bag device may be mounted also on the seat back 30 for protecting an occupant in a rear seat.

The panels are made of cloths in the above mentioned embodiments, but the panels may be instead made of synthetic resin sheet.

The upper panel and the lower panel are connected by sewing up, but these panels may be connected also by adhesion or heat sealing.

As mentioned above, the air bag according to the present invention is capable of protecting knees and legs of the occupant sufficiently with the protrusion deployed in front of the knees. The protrusion thus deployed restricts the lower part of the body of the occupant from moving forward.

The air bag according to the present invention is formed by superposing two panels and sewing up the peripheral portions thereof, so that it can be made easily and the production cost of an air bag for a passenger seat or an air bag for a rear seat can be remarkably reduced. In the air bag according to the present invention, the protrusion is also formed quite easily.

And in the air bag according to the present invention, a relative position between the vent hole and the opening for an inflator can be defined exactly as desired in design.

The specification refers to the disclosure of application Ser. No. 322,515 filed on Oct. 14, 1994.

What is claimed is:

1. A combination comprising an air bag device for an occupant and a vehicle, said vehicle having an instrument panel, and said air bag device including a casing disposed in the instrument panel;

an inflator disposed in the casing, and an air bag folded and disposed in the casing, said air bag being formed of first and second panels superposed on each other and connected at respective peripheral portions thereof to form a main portion having a first end near the instrument panel and a second end opposite to the first end, said first and second panels being formed of cloth and connected by sewing, said first panel having a length longer than that of the second panel in a longitudinal direction of the vehicle, an opening located near the first end, said first panel being connected to the casing around the opening for introducing gas from the inflator into the air bag, and a middle portion situated between the opening and the second end and disposed near the opening, said middle portion being folded and connected at side edges thereof to form a protrusion adjacent the opening extending downwardly from the main portion so that when the air bag is inflated, said protrusion deploys in front of and adjacent to a front surface of the instrument panel of the vehicle to protect knees of the occupant and the main portion restrains a body of the occupant, said protrusion having inlet portions superposed and sewn up by a thread having a strength to snap after said first panel is extended in the longitudinal direction of the vehicle.

2. A combination as claimed in claim 1, wherein the middle portion has a width smaller than that of the second panel to reduce volume of the protrusion.

3. A combination as claimed in claim 2, wherein the first panel includes at least one vent hole between the opening and the protrusion, said vent hole allowing the gas to flow out from the air bag when the occupant hits the air bag so that an impact applied to the occupant is absorbed.

4. A combination as claimed in claim 3, wherein said second end of the air bag extends toward a waist of the occupant when the air bag deploys.

5. A combination as claimed in claim 4, wherein said first and second panels are formed integrally with each other at one side of the air bag.

6. A combination as claimed in claim 3, wherein said first panel includes four flaps around the opening to connect the air bag to the inflator, two of the four flaps facing each other being integrally formed with the first panel and the other two flaps being formed separately from the first panel and fixed to the first panel.

7. A combination comprising an air bag device for an occupant and a vehicle, said vehicle having an instrument panel, and said air bag device including a casing disposed in the instrument panel;

an inflator disposed in the casing, and an air bag folded and disposed in the casing, said air bag being formed of first and second panels superposed on each other and connected at respective peripheral portions thereof to form a main portion having a first end near the instrument panel and a second end opposite to the first end, said first panel having a length longer than that of the second panel in a longitudinal direction of the vehicle, an opening located near the first end, said first panel being connected to the casing around the opening for introducing gas from the inflator into the air bag, and a middle portion situated between the opening and the second end and disposed near the opening, said middle portion being folded and connected at side edges thereof to form a protrusion adjacent the opening extending downwardly from the main portion and having a width smaller than that of the second panel to reduce volume of the protrusion so that when the air bag is inflated, said protrusion deploys in front of and adjacent to a front surface of the instrument panel of the vehicle to protect knees of the occupant and the main portion restrains a body of the occupant, said first panel further including at least one vent hole situated between the opening and the protrusion and four flaps around the opening to connect the air bag to the inflator, two of the four flaps facing each other being integrally formed with the first panel and the other two flaps being formed separately from the first panel and fixed to the first panel, said vent hole allowing the gas to flow out from the air bag when the occupant hits the air bag so that an impact applied to the occupant is absorbed.

* * * * *